United States Patent [19]

Brown

[11] 4,214,273
[45] Jul. 22, 1980

[54] CIRCUIT FOR INDICATING ANTENNA SIGNAL INPUT LEVEL ON TELEVISION RECEIVER SCREEN

[75] Inventor: Timothy W. Brown, Williamsville, N.Y.

[73] Assignee: GTE Products Corporation, Stamford, Conn.

[21] Appl. No.: 21,384

[22] Filed: Mar. 19, 1979

[51] Int. Cl.² .............................................. H04N 5/50
[52] U.S. Cl. ................................. 358/188; 358/192.1; 358/183
[58] Field of Search ................ 358/188, 192, 139, 183

[56] References Cited

U.S. PATENT DOCUMENTS 3,862,354  1/1975  Kawamata ............................. 358/192

FOREIGN PATENT DOCUMENTS 1103962  4/1961  Fed. Rep. of Germany .......... 358/192

Primary Examiner—Robert L. Griffin
Assistant Examiner—Michael A. Masinick
Attorney, Agent, or Firm—Theodore D. Lindgren

[57] ABSTRACT

A circuit for use in a television receiver to obtain a variable-length bar on the television screen which indicates the optimum antenna position, the circuit comprised of at least two monostable multivibrators with input terminals triggered by horizontal and vertical synchronizing pulses and with outputs coupled through an AND circuit to a video/chroma driver amplifier. The pulse length of one of the multivibrators is caused to vary in relation to the strength of an AGC signal in the video signal path of the receiver by coupling the AGC output to the time-constant-determining network of the multivibrator.

4 Claims, 3 Drawing Figures

CIRCUIT FOR INDICATING ANTENNA SIGNAL INPUT LEVEL ON TELEVISION RECEIVER SCREEN

TECHNICAL FIELD

This invention relates to a television receiver circuit for providing a visual indication on the television screen for the purpose of allowing the viewer to adjust the receiver antenna for maximum signal energy transfer from the antenna to the television receiver.

BACKGROUND ART

Previously known circuits for visual indication of tuning have been used in conjunction with a "tuning-eye" tube. Such circuits provide an indication of the center frequency and thus are used in conjunction adjustment of frequency-sensitive applications. The circuits are generally ineffective for use in adjustment of antenna position for maximum signal amplitude.

Automatic gain control circuits are commonly used in television receivers, often in both the tuner RF-frequency amplifiers and in the intermediate frequency amplifiers.

DISCLOSURE OF THE INVENTION

The circuit of this invention utilizes at least two monostable multivibrators whose inputs are triggered by horizontal and vertical synchronizing pulses and whose outputs are coupled through an AND circuit to a video/chroma driver amplifier. The pulse length of one of the two multivibrators is caused to vary by coupling an output of the television receiver automatic gain control to a time-constant-determining network of the multivibrator. The pulse length is therefore also related to the signal output of an antenna coupled to the receiver. The output of the two multivibrators cause a bar to appear on the teleision receiver screen. Adjustment of the antenna to result in a maximum length, for example, of the bar indicates that the particular antenna position causes a maximum of signal energy transfer between antenna and receiver.

PREFERRED MODE FOR CARRYING OUT THE INVENTION

For a better understanding of the present invention, together with advantages and capabilities thereof, reference is made to the following disclosure and appended claims in connection with the above description of some of the aspects of the invention.

Figure 1:
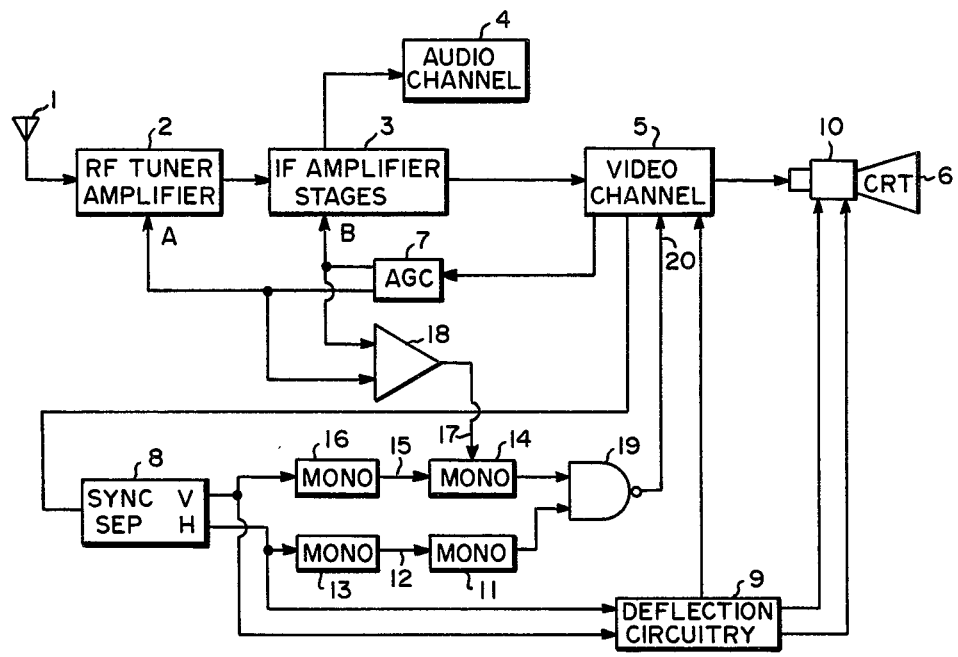
FIG. 1 is a block diagram of a television receiver incorporating the circuit of this invention.

Typical television receiver circuit components are illustrated in block diagram form in FIG. 1. Such typical components include antennae 1 for intercepting or receiving a television signal. Antennae 1 are usually directional in nature and generally are comprised of a plurality of individual subassemblies which may be rotated or otherwise positioned and adjusted to obtain the maximum signal output for particular television station signals or for a particular range of frequencies such as the UHF or VHF ranges. In many cases, the antennae 1 are comprised of a pair of adjustable-length rods commonly referred to as "rabbit ears" and of a wire circle, both of which may be adjusted by the viewer to obtain what is deemed to be the best possible television picture.

The output terminal or terminals antennae 1 are coupled to radio-frequency (RF) tuner-amplifier 2. The tuner heterodynes the received signal to an intermediate frequency (IF). The IF signal is coupled through the video signal circuit path to IF amplifier stages 3 which couple at least the audio portion of the received signal to an audio channel 4 and at least the video portion through the video signal circuit path to a video channel 5. Video channel 5 may include a chroma processor and said video channel 5 transmits one or more signals through the video signal circuit path to an image display device illustrated as a cathode ray tube (CRT) 6.

The composite video signal is also coupled from video channel 5 to an automatic gain control (AGC) circuit 7 which provides AGC signals to first gain control input A of RF tuner-amplifier 2 and to second gain control input B of IF amplifier stages 3. The composite video signal is also coupled to a synchronizing pulse separator 8 which couples the separated synchronizing pulses to deflection circuitry 9. Horizontal pulse terminal H of separator 8 provides an output comprised of pulses sequenced at timed intervals corresponding to the horizontal deflection interval. Similarly, vertical pulse terminal V of separator 8 provides an output comprised of pulses sequenced at timed intervals corresponding to the vertical deflection interval.

Deflection circuitry 9 provides horizontal and vertical deflection signals to vertical deflection yoke 10 associated with CRT 6. In addition, the deflection circuitry may be a source of blanking signals for video channel 5 as well as a voltage source for CRT 6 and other circuits.

Figure 3:
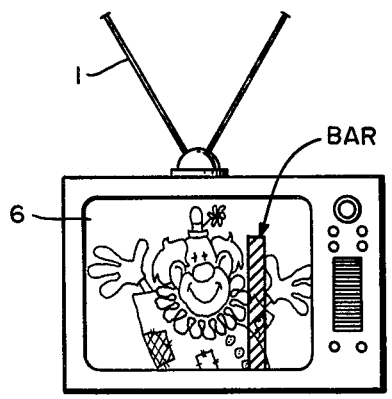
FIG. 3 illustrates a visual indication resulting from the circuit of this invention.

The circuit of this invention, when activated, provides a signal to the input of CRT 6 which causes a stripe or bar as illustrated in FIG. 3 to appear on the screen of CRT 6, the stripe or bar being superimposed on the picture transmitted by the television station to which the tuning device of the receiver has been set. Changing the position of the part of antennae 1 receiving the station signal, and/or otherwise adjusting the particular antenna, causes the length of the stripe or bar to change in relation to the strength of the signal output of the antenna. For example, at maximum signal output, the length of the stripe or bar may be a maximum. In that case, the viewer positions and adjusts the antenna for the particular frequency channel of the station until the length of the bar is maximized. The circuit of this invention may then be de-coupled from the receiver circuit in any manner which removes the bar from the television screen.

A preferred embodiment of the circuit of this invention utilizes monostable multivibrators to determine the position of and to determine the length of the stripe or bar which is caused to appear on the picture tube screen. A first monostable multivibrator 11 has a triggering input 12 coupled to receive horizontal synchronizing pulses or other timing signals related to the horizontal deflection interval. Triggering input 12 may, for example, be coupled to the same terminal H of synchronizing pulse separator 8 which provides horizontal synchronizing pulses for deflection circuitry 9. First monostable multivibrator 11 may be coupled to the source of timing signals through a horizontal-positioning monostable multivibrator 13, the time constant of which may be varied to delay the triggering of multivibrator 11 such that multivibrator 11 is activated at a time other than the beginning of the horizontal sweep. Effectively, the left side of the bar or stripe which appears on the picture tube screen may be positioned on the screen by varying the time-constant of multivibrator 13. In a similar manner, the width of the bar or stripe may be adjusted by adjusting the time constant of multivibrator 11.

A second monostable multivibrator 14 has a triggering input 15 coupled to receive vertical synchronizing pulses or other timing signals related to the vertical deflection interval. Triggering input 15 may, for example, be coupled to the same terminal V of synchronizing pulse separator 8 which provides vertical synchronizing pulses for deflection circuitry 9. Second monostable multivibrator may be coupled to the source of timing signals through a vertical-positioning monostable multivibrator 16, the time constant of which may be varied to effectively vertically position one end of the bar or stripe on the television screen. Second monostable multivibrator 14 is provided with circuitry for varying its pulse width in response to a changing d.c. voltage applied to variable-length-pulse input terminal 17. Terminal 17 is coupled to at least one output of AGC circuit 7, which provides a d.c. signal which changes in value as the video signal output of a particular antenna changes in response to movement or other adjustment.

In many television receivers the AGC control signal may affect only the RF amplifiers in one range of output voltage of said signal and may affect both the IF and RF amplifiers in the remaining range of the output voltage. Therefore, if it is desired to have a visual indication of changing AGC voltage over the entire range of output voltage, the output of the AGC signal at terminal B of IF amplifier stage 3 may be added to the AGC signal at terminal A of RF amplifier 2 by summing means 18. Where such visual indication is desired for weak signals only, summing means 18 may be omitted and terminal 17 may be coupled to the AGC signal which is most sensitive to the weak signals.

The outputs of monostable multivibrator are coupled by means of AND circuit 19 to modulating input terminal 20 of video channel 5. The output of AND circuit 19 may, for example, be coupled to the final stage of the video amplifier of a monochrome receiver in a manner which either drives the amplifier toward saturation or in a manner which drives the amplifier toward cutoff during the time periods in which both monostable multivibrators 11 and 14 are activated. The resulting bar or stripe on the television screen will tend toward a white or black color depending on the choice and in either case at least a part of the video signal energy will be diverted away from the video signal circuit path. When used with color receivers, the output of AND circuit 19 may be coupled to one or more of the red, green and/or blue driver amplifiers which drive the associated electron guns of the color picture tube. For example, the resulting bar or stripe will tend toward a red color superimposed on the picture if the output of AND circuit 19 is connected to the red driver amplifier in a manner which increases the driving signal during the period of time in which both of multivibrators 11 and 14 are activated.

Figure 2:
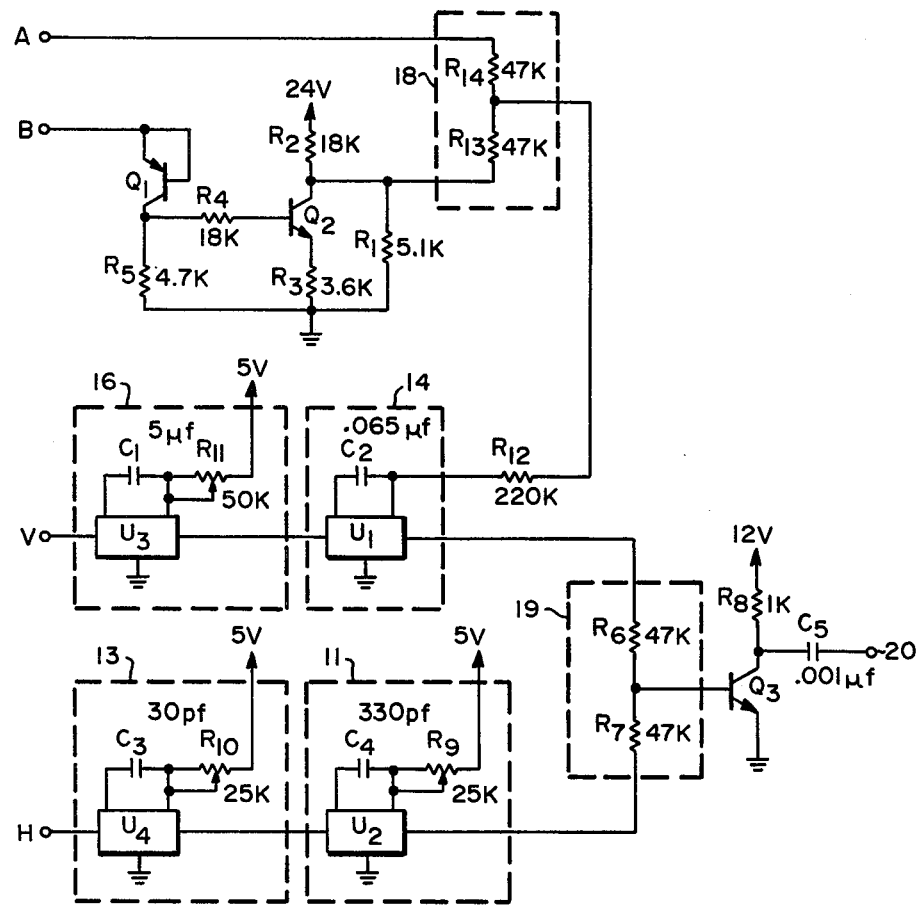
FIG. 2 is an example embodiment of the circuit of this invention.

The circuit of FIG. 2 discloses one embodiment of the invention as used in a color television receiver. Where appropriate, block elements similar to those of FIG. 1 are indicated by designated dashed lines. Transistor $Q_1$ replaces a blocking diode commonly used in AGC circuits to separate the tuner AGC signal from the IF AGC signal where the tuner AGC operates at low signal voltage and the IF AGC operates at greater signal voltages. Transistor Q1 provides a source of current through $R_5$ and therefore a voltage across $R_5$ which is proportional to the IF AGC signal. The IF AGC signal is inverted, amplified and level shifted by a coupling circuit comprised of $Q_2$, $R_1$, $R_2$, $R_3$ and $R_4$. The tuner AGC signal at A and the IF AGC signal at B are sampled by resistors $R_{14}$ and $R_{13}$ and summed at summing junction 18 to drive the RC time constant of $R_{12}$ and $C_2$ which control the length of the pulse of $U_1$. $U_1$ and $U_2$ are triggered by the vertical and horizontal position of one end of the bar or stripe is controlled by the values of $R_{11}$ and $C_1$ which control the time constant monostable multivibrator $U_3$. The horizontal length and position are controlled by adjustment of the time constants of $R_9$ and $C_4$ and of $R_{10}$ and $C_3$ which are connected to monostable multivibrators $U_2$ and $U_4$. The horizontal and vertical pulse outputs of $U_1$ and $U_4$ are "AND"ed by $R_6$ and $R_7$. The "AND"ed signal is inverted, level-shifted and coupled to the video signal circuit path at terminal 20 through $Q_3$, $R_8$ and $C_5$. Modulating input terminal 20 may be, for example, coupled to the base resistor of the R-Y driver transistor to result a red bar appearing on the television screen. Multivibrators $U_1$ and $U_3$ as well as $U_2$ and $U_4$ are commercially available circuits manufactured in integrated circuit form.

The bar of the circuit may be, of course, positioned horizontally and caused to expand and contract in the horizontal direction through use of obvious alternate circuit connections.

The automatic frequency control of the television receiver may be deactivated during activation of the circuit of this invention in order that the frequency control circuitry does not interfere with maximizing the antenna adjustment.

While there has been shown and described what are at present considered the preferred embodiments of the invention, it will be obvious to those skilled in the art that various changes and modifications may be made therein without departing from the scope of the invention as defined by the appended claims.

I claim:

1. A television receiver circuit for indication on-screen of the optimum television antenna position and adjustment, said receiver including an RF tuner-amplifier, an IF amplifier stage, an AGC circuit providing an AGC signal to a gain control terminal on at least one of said tuner-amplifier and of said IF amplifier stage, a synchronizing pulse separator having a horizontal pulse output terminal and a vertical pulse output terminal, and a video channel having a modulating input terminal, said receiver circuit comprised of a first monostable multivibrator and with a triggering input coupled to one of said pulse output terminals of said separator, of a second monostable multivibrator with a variable-length-pulse input terminal coupled to said gain control terminal and with a triggering-input terminal coupled to the other of pulse output terminals said terminals of an AND circuit with inputs coupled to the outputs of said monostable multivibrators and with output coupled to said modulating input terminal.

2. The receiver circuit of claim 1 in which said AGC circuit provides AGC signals to gain control terminals on both said RF-tuner amplifier and said IF amplifier stage and wherein said variable-length-pulse input terminal is coupled to said gain control terminals by a summing means.

3. The receiver circuit of claim 1 wherein said triggering input of said first monostable multivibrator is coupled to said one of said pulse output terminals by a positioning monostable multivibrator.

4. The receiver circuit of claim 1 wherein said triggering input of said second monostable multivibrator is coupled to said other of said pulse output terminals by a positioning monostable multivibrator.

* * * * *